(12) United States Patent
Tuunanen et al.

(10) Patent No.: US 7,340,507 B2
(45) Date of Patent: Mar. 4, 2008

(54) NETWORK ARCHITECTURE AND METHODS FOR SERVICE SCRIPT EXECUTION AND MANAGEMENT

(75) Inventors: Heikki Tuunanen, Helsinki (FI); Jari Syrjala, Vantaa (FI); Jukka Wallenius, Helsinki (FI)

(73) Assignee: Nokia Corporation, Espoo (FI)

( * ) Notice: Subject to any disclaimer, the term of this patent is extended or adjusted under 35 U.S.C. 154(b) by 928 days.

(21) Appl. No.: 10/119,527

(22) Filed: Apr. 9, 2002

(65) Prior Publication Data

US 2002/0169776 A1 Nov. 14, 2002

Related U.S. Application Data

(63) Continuation of application No. PCT/EP00/08591, filed on Sep. 1, 2000.

(51) Int. Cl.
G06F 15/16 (2006.01)
H04M 3/42 (2006.01)
(52) U.S. Cl. .................. 709/219; 379/201.03
(58) Field of Classification Search ............. 709/219; 379/201.03
See application file for complete search history.

(56) References Cited

U.S. PATENT DOCUMENTS

| | | | |
|---|---|---|---|
| 5,828,672 A | | 10/1998 | Labonte et al. |
| 5,907,607 A | * | 5/1999 | Waters et al. .......... 379/201.03 |
| 6,243,451 B1 | * | 6/2001 | Shah et al. ............ 379/201.03 |
| 6,940,847 B1 | * | 9/2005 | Glitho et al. ............... 370/352 |
| 7,167,550 B2 | * | 1/2007 | Klos et al. .............. 379/201.01 |
| 2002/0064149 A1 | * | 5/2002 | Elliott et al. ................. 370/352 |
| 2003/0161296 A1 | * | 8/2003 | Butler et al. ................. 370/352 |
| 2005/0193269 A1 | * | 9/2005 | Haswell et al. ............... 714/38 |

FOREIGN PATENT DOCUMENTS

| | | |
|---|---|---|
| JP | 2000-163272 | 6/2000 |
| WO | 9722209 | 6/1997 |
| WO | 9920060 | 4/1999 |
| WO | 0042760 | 7/2000 |

OTHER PUBLICATIONS

"Programming Internet Telephone Services" IEEE Network, IEEE Inc., NY US, vol. 13, No. 3 May 1999, pp. 42-49.

* cited by examiner

Primary Examiner—David Wiley
Assistant Examiner—J. Bret Dennison
(74) Attorney, Agent, or Firm—Alfred A. Fressola; Ware, Fressola, Van Der Sluys & Adolphson, LLP (57) ABSTRACT

A communication network comprising at least an application server means (APSE), a subscriber information register means (HSS), a call state control functional entity (CSCF), and a service portal (SP), wherein the application server means (APSE) is connected to the service portal (SP) and to the call state control functional entity (CSCF), the service portal is further connected to the home subscriber server means (HSS), and the subscriber information register means (HSS) is further connected to the call state control functional entity (CSCF). In connection with the proposed network architecture, methods for handling service scripts within the network with regard to creation and storage of service scripts, provisioning the service scripts for a user, distribution of the scripts in the network and execution of the scripts during call processing are also described.

22 Claims, 2 Drawing Sheets

NETWORK ARCHITECTURE AND METHODS FOR SERVICE SCRIPT EXECUTION AND MANAGEMENT

CROSS-REFERENCE TO RELATED APPLICATION

This application is a continuation of International Application PCT/EP00/08591 having an international filing date of Sep. 1, 2000 and from which priority is claimed under all applicable sections of Title 35 of the United States Code including, but not limited to, Sections 120, 363 and 365(c).

FIELD OF THE INVENTION

The present invention concerns the field of IP telephony, i.e. telephony using the Internet Protocol, and more particularly, is related to the usage of service scripts for controlling the call handling in a communication network operated, e.g. according to the Internet Protocol, and hereinafter also referred to as all-IP network.

BACKGROUND OF THE INVENTION

Hitherto, in a communication environment, value added services have centrally been implemented in a so-called Service Control Point (SCP) using intelligent network (IN). Thus, service creation, management and execution has been centralized to the service control point SCP as a specialized functional entity.

Service scripts provide a means to create and manage value added services in a centralized fashion (which is the benefit of an intelligent network) but distribute fully the service execution (which is a bottleneck of an intelligent network).

Service logic is defined with a script which can be moved between functional elements (FE) in an all-IP network and which is executed in a suitable FE.

Usable script languages can be, for example, CPL (Call Processing Language), SIP Servlets (SIP: Session Initiation Protocol) representing executable instructions which handle SIP messages, or CGI (Common Gateway Interface). However, although the present description refers to the above mentioned script languages, this is only for explanatory purposes and by no way limiting the applicability of the present invention to those script languages. Of course other script languages can be used in connection with the present invention.

More precisely, referring to the Call Processing Language (CPL), CFL is related to IP telephony. IP telephony enables calls and multimedia sessions such as simultaneous video and audio calls to be set-up across IP networks. The CPL is intended to be a simple lightweight, efficient and easy to implement language for IP telephony supplementary service creation. It is intended to be independent of operating systems or signaling protocols such as SIP or H.323. CPL is intended particularly for end-user-defined supplementary service creation. The aim is that these scripts can be defined and provisioned quickly on the spot. Because of this, for the creation of CPL scripts various user friendly techniques such as graphical symbolic editors have been envisioned.

CPL is not related to the creation of end-to-end teleservices such as voice or video calls. Instead it is used for supplementary service creation. By a supplementary service is meant a service that is separately defined to alter in the network the treatment of calls involving certain basic end-to-end services i.e. teleservices and bearer services. For example, supplementary services can affect call routing (e.g. redirect them to different addresses) or screen incoming or outgoing calls.

The CPL language scripts are distributed to the IP telephony servers participating in the handling of the calls that need to be affected using these supplementary services. The scripts are inserted in these servers by the IP telephony network management system, end-user or administrators. There can be several CPL script instances participating to the handling of a given call. The individual script instances are triggered and executed on signalling events conforming to predefined criteria such as caller or callee identification. For example, when there is an incoming call to a subscriber who has defined an incoming call screening script, the script is executed because the callee identification matches.

In general, scripts (service scripts) provide an efficient, portable and powerful tool for executing control instructions in a distributed network. Scripts are for example used in Internet web pages to create different kind of effects for users. A script is transferred (downloaded) from a web server to the local computer and executed there.

Furthermore, up to now the architecture has been open, both in standardization and implementation. However, in order to use scripts for service implementation, some architecture and arrangement must be provided.

Moreover, using CPL scripts in connection with SIP invite methods means to put call processing language (CPL) scripts into SIP invite methods. These can provide a service execution in proxy nodes as specified by the user in an IN network type. Hitherto, however, a SIP client (terminal) added the script to the invite method, thereby resulting in an increased signaling amount.

SUMMARY OF THE INVENTION

It is an object of the present invention to provide an architecture and handling scenario for using service scripts within an all-IP communication network.

Still further, it is an object of the present invention to improve the usage of, for example, CPL scripts in connection with SIP invite methods.

Also, the present invention aims to provide
a solution for a functional work split in all-IP architecture for network and user originated service script creation, distribution and execution,
improved concepts on how scripts can be created and what parameters should be taken into account,
improved concepts on how script execution can be managed so that network integrity and performance is not in danger,
improved concepts on how scripts are armed and executed in the network and what data is needed for these purposes,
improved concepts for script storage and delivery across the network, including suggestions for required parameters,
improved concepts for separating the data and logic of the script.

In addition, it is an object of the present invention to prevent misbehaving users from attacking the computers of an all-IP communication network over the network when using service scripts within said network.

According to the present invention, the above objects and aims are, for example, fulfilled by a communication network, said network comprising at least an application server means, a subscriber information register means, a call state control functional entity, and a service portal, wherein said application server means is connected to said service portal and to said call state control functional entity, said service portal is further connected to said subscriber information register means, and said subscriber information register means is further connected to said call state control functional entity, wherein said application server means comprises a script management functional entity, and said script management functional entity is adapted to manage service in a script database of said application server means, which script database is adapted to store master copies of service scripts, wherein said managing functionality comprises at least one of the following functionalities: create, receive, test, check, validate, distribute and modify.

According to further technical solutions
- said script management functional entity is exclusively accessible by the operator of said communication network;
- said script management functional entity is adapted to manage scripts to be stored and/or already stored;
- said script database is connected to said service portal and to a secondary storage means for service scripts of said call state control functional entity;
- said call state control functional entity further comprises a serving profile database, and said subscriber information register means comprises at least a subscriber profile database, and wherein said connection between said subscriber information register means and said call state control functional entity is established between the respective databases thereof;
- said service portal is connectable via an access path to a terminal equipment;
- said terminal is a wireless user equipment and said access path is established via a mobile communications network, such as a GPRS network;
- said terminal is a workstation and said access path is established via the internet;
- a communication originates from or terminates at a terminal equipment, said terminal being connected to said call state control functional entity via an access network;
- said terminal equipment is operated based on the internet protocol.

According to the present invention, the above objects and aims are, for example, also fulfilled by
- a terminal equipment, said terminal comprising a functional entity which is adapted to enable the user of said terminal to manage service scripts, said managing comprising at least one of the following functions: create, test, distribute and modify service scripts.

According to further technical solutions
- said terminal further comprising a memory for storing the service scripts created or modified by the user at the terminal;
- said terminal is adapted to store the created or modified service scripts in a storage location of a communication network, to which network said terminal is registered;
- said terminal is adapted to store the created or modified service scripts in a buffer memory of the call state control functional entity of said network, in case said script is valid for only one communication connection;
- said terminal is adapted to store the created or modified service scripts in a subscriber profile database of a subscriber information register means of said network, in case said script is valid for at least one communication connection.
- said terminal is adapted to store the created or modified service scripts in the application server of a home subscriber server of said network, in case said script is valid for at least one communication connection;

It is to be noted that it is also conceivable to achieve the above objects and aims by a method according to which the user creates the services (service scripts) using an external functionality (not forming part of the CSCF, HSS, APSE, terminal), which functionality offers a flexible user interface for service script creation and testing. The user defines the service using the external functionality and the functionality, as a result, provides a corresponding service script at its output (e.g. a CPL script). The service script may then be transmitted either to the application server via the service portal or to the terminal of the user.

According to the present invention, the above objects and aims are, for example, also fulfilled by
- a communication system comprising a communication network as set out above and at least one terminal as set out above.

According to the present invention, the above objects and aims are, for example, also fulfilled by
- a method of handling service scripts within a communication network, said method comprising the steps of creating service scripts by the network operator using a script management functional entity, and storing said service scripts in a script database adapted to store master copies of service scripts.

According to further technical solutions:
- the method comprises the steps of: loading, upon request of a respective user to manage his profiles, a copy of the master copies of the scripts from said script database and a copy of currently set scripts for said respective user from a subscriber profile database, to a service portal, providing a user interface according to currently set script settings at said service portal, selecting a loaded service script for changing the current setting of the profile, and storing an update of the set script settings in said subscriber profile database;
- the method comprises the steps of: providing a user interface in the service portal to receive user originated scripts for storage in the application server;
- currently set scripts for said respective user in said subscriber profile data base are network originated scripts created in the network by the network operator or user originated scripts created by the user of a terminal at the terminal, or created by a user using an external functionality dedicated for service script creation;
- said subscriber profile database contains, for each script selected by a user, a script key as a pointer to the script logic of said script stored in said script database and script data unique to the respective user;
- said script key is represented as a bit vector, with one bit of said bit vector representing the type of a service and the remaining bits of said bit vector represent features of said type of service;
- said method further comprises the steps of: forwarding said script keys and script data contained in said subscriber profile database to a serving profile database of a call state control functional entity, checking that for the received script key a corresponding script is contained in a secondary storage means for service scripts of said call state control functional entity, fetching the corresponding script logic from the secondary memory means upon occurrence of a script execution event;
- each script key addresses a script logic fragment as a corresponding script, and the method further comprises the steps of composing a script to be executed from the script fragments addressed by the script keys, and executing the script logic of the composed script with the user specific script data.

Also, the present invention is directed to a method of handling service scripts within a communication network, said method comprising the step of composing service scripts within the network based on information from a subscriber data register.

According to further technical solutions, the service scripts are executed in call processing servers;

the information from said subscriber data register comprises features assigned to a subscriber and at least one service script is composed using the information on the said features;

the said features assigned to a subscriber are mapped to code skeletons;

the information from the said subscriber data register comprises also at least one parameter associated with these features;

the subscriber data register is inquired by the call processing servers in the network to enable the composing of the service scripts;

said call processing servers are equipped to send service scripts to other call processing servers to provide the overall service for a given subscriber;

the call processing servers are equipped to request the deletion of said service scripts in other call processing servers;

the call processing servers forward the information from the subscriber data register to an entity in association with the call processing server which composes the service scripts;

said entity in association with the call processing server is a service execution environment.

Also, the present invention is directed to a computer system comprising an execution environment for running an application for handling service scripts within a communication network operated according to the internet protocol according to the above method steps; and to a computer program product, loadable into the memory of a digital computer and comprising software code portions for performing the above method steps.

Accordingly, the present invention provides an architecture and a basic handling scenario which describes how scripts are created and stored scripts are provisioned for a user scripts are distributed in a all-IP core network scripts are executed during call processing.

BRIEF DESCRIPTION OF THE DRAWINGS

The present invention and its features and advantages will become more fully apparent when referring to the detailed description of the accompanying drawings, in which.

DETAILED DESCRIPTION OF THE DRAWING

Figure 1:
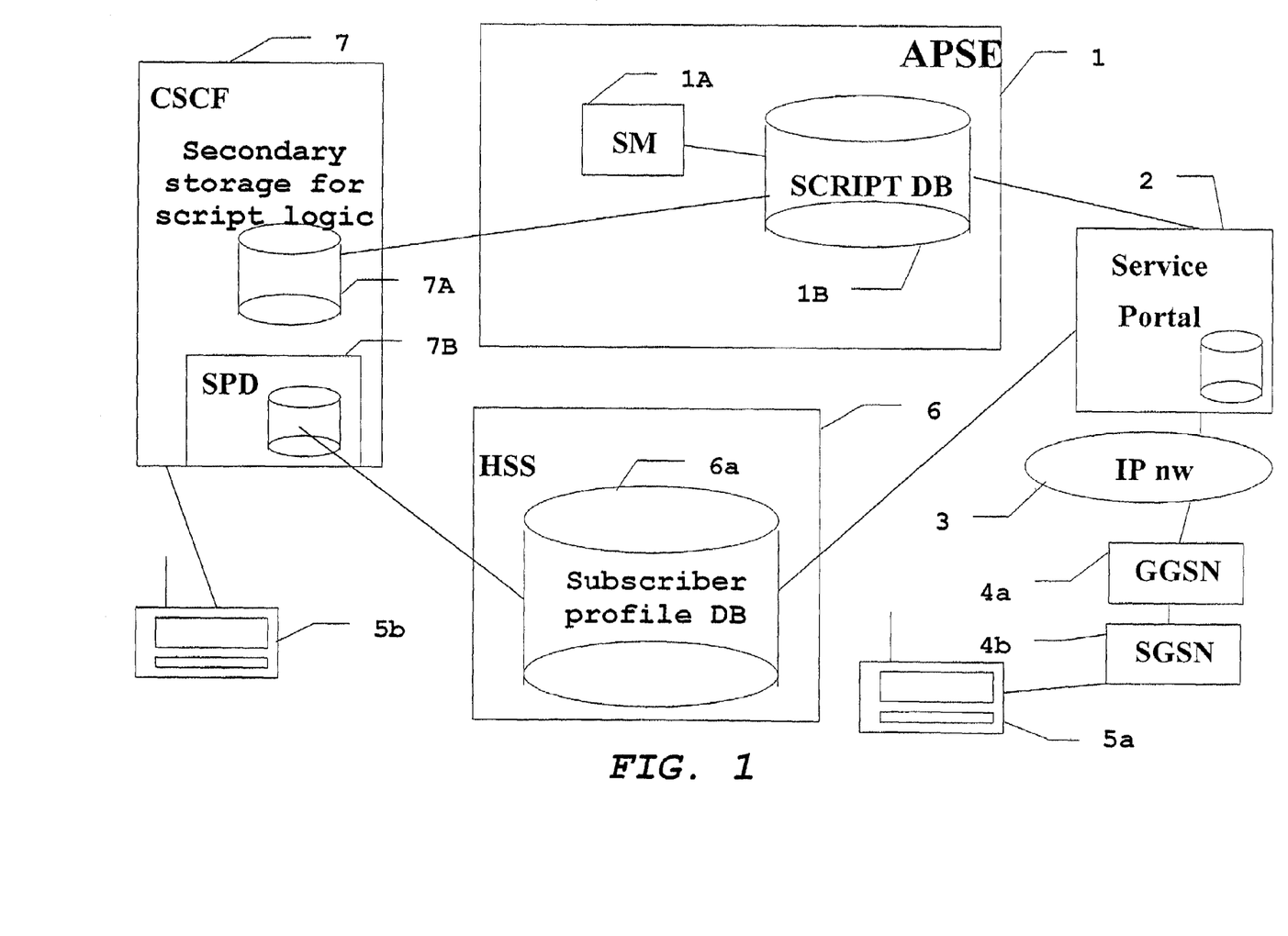
FIG. 1 illustrates a basic network architecture of an all-IP communication network according to the present invention and adapted to the script handling scenarios according to the present invention.

Firstly, the architecture of the communication network as illustrated in FIG. 1 is described, and secondly, the script handling scenarios within said network architecture are explained.

I. Communication Network Architecture of the IP Based Communication Network

FIG. 1 illustrates an explanatory view of the communication network architecture. It is to be noted that the drawings illustrate only those parts of the communication network which are essential in connection with the present invention and, for simplicity of drawing and explanation, that the illustrated number of respective parts is reduced to a minimum number.

The illustrated communication network used as an example is assumed to be operated according to the Internet Protocol (IP) and thus constitutes a so-called all-IP network. Basically, said network comprises at least an application server means 1, a home subscriber server means 6 as a subscriber information register, a call state control functional entity 7, and a service portal 2. Said application server means 1 is connected to said service portal 2 and to said call state control functional entity 7, said service portal 2 is further connected to said home subscriber server means 6, and said home subscriber server means 6 is further connected to said call state control functional entity 7.

Note that the service portal 2 represents a service portal functionality. Although the service portal is illustrated as being separately provided from the application server APSE, it is of course, also possible that the service portal functionality is included in the application server. However, for explanation purposes, the description addresses to the service portal as a separate functionality.

Said application server means 1 comprises a script management functional entity 1A. Said script management functional entity 1A is exclusively accessible by the operator of said communication network and is adapted to create, receive, check/validate, test, distribute and/or modify service scripts to be stored and/or already stored in a script database 1B of said application server means 1. Said script database 1B is adapted to store master copies of service scripts, which can only be read by the call state control functional entity 7 and/or the service portal 2. A writing of service scripts to the script database 1B is only possible from the script management functional entity 1A. The expression master copy of a script is intended to mean the script logic in the sense of a set of executable instructions without the individual data to be processed (the individual data depend for example on a specific user/terminal and or conditions prevailing in the network) or the script logic including the data for the script (both options are possible).

More particularly, said script database 1B is connected to said service portal 2 and to a secondary storage means 7A for service scripts of said call state control functional entity 7.

With regard to said call state control functional entity 7, this entity further comprises a serving profile database 7B, and said home subscriber server means 6 comprises at least a subscriber profile database 6A. Said connection between said home subscriber server means 6 and said call state control functional entity 7 is established between the respective databases 6A, 7B thereof. Also, the connection from said service portal 2 to said home subscriber server 6 is actually established from the service portal 2 to the subscriber profile database 6A of said home subscriber server 6.

Additionally, said service portal 2 is connectable via an access path 3, 4a, 4b to a terminal equipment 5a which is operated based on the internet protocol. In the illustrated example as shown in FIG. 1, said terminal 5a is a wireless user equipment (3G_UE) and said access path is established via an IP network 3, a mobile communications network, for example a GPRS core network constituted by a serving GPRS support node (SGSN) 4b and a gateway GPRS support node (GGSN) 4a, and a radio access network (not shown). However, alternatively and not shown in FIG. 1, said terminal 5a can be a workstation and said access path may be established via the internet (i.e. without the need to use a GPRS network).

In the illustrated communication network, a communication originates from or terminates at a terminal equipment 5b, said terminal being connected to said call state control functional entity 7 via an access network (e.g. a radio access network, not shown).

Note that although terminals 5a and 5b are shown in FIG. 1, these terminals may be identical. That is, a terminal 5b used for communication via said communication network may be adapted to access the service portal 2 (situation illustrated using terminal 5a) for modification of service profiles defined for said terminal by respective service scripts.

The terminal comprises a functional entity (not shown) which is adapted to enable the user of said terminal to create, test, distribute and/or modify service scripts. Thus far, this functional entity at the terminal side is similar to the script management functionality 1A of the application server 1, while the provided functionality for the scripts at the terminal side is mostly less powerful (e.g. only a restricted set of script language commands is available for the user at the terminal). Also, the terminal further comprises a memory for storing the service scripts created or modified by the user at the terminal. Irrespective of whether the terminal is provided with a local memory for storing the scripts created at the terminal, the terminal is adapted to store the created or modified service scripts in a storage location of a communication network operated according to the Internet Protocol, to which network said terminal is registered.

For example, the terminal is adapted to store the created or modified service scripts in a buffer memory (not shown) of the call state control functional entity 7 of said network, in case said script is valid for only one communication connection. Alternatively, the terminal is adapted to store the created or modified service scripts in a subscriber profile database 6A of a home subscriber server 6 of said network, in case said script is valid for at least one communication connection. In addition, the terminal can store the created or modified scripts (via the service portal 2) also in the script database 1B of an application server 1, in case said script is valid for at least one communication connection.

Note also that scripts can be created with an external functionality which is dedicated to this purpose, and that also such externally created scripts may be stored in the application server via the service portal.

The communication network as briefly described above in combination with at least one terminal as briefly described above constitutes a communication system.

II. Script Handling Scenarios

Subsequently, script handling scenarios within said network architecture and the communication system are explained.

It is to be noted that scripts may be created either by the operator in the network or by the user in the terminal (or using an external functionality dedicated for script creation). In the following, scripts created in the network (i.e. by the network operator) are referred to as "network originated scripts" and scripts created by the user are referred to as "user originated scripts".

II.1. Network Originated Script Creation and Storage

For a communication environment, access to network resources should be made in a secure, controlled manner. This means that an essential part of script usage in an all-IP communication environment (network) resides in ensuring that script execution does neither hazard nor harm normal call handling.

One way to assure this is to allow only the operator to use powerful script languages (such as for example CGI or SIP Servlets) freely. The user may then select a script template which he desires to use from the scripts already made by the network operator. Also, a user could be allowed to combine "script components" provided by the network operator and thus create a script from those components. This means that functional elements taking care of script creation, testing and storage are needed by the operator in the network. These functional elements could be part of an application server (APSE) 1 as described in FIG. 1, where they are denoted as script management functional entity (SM) 1A adapted to create, test, distribute and/or modify service scripts to be stored and/or already stored in a script database (SCRIPT DB) 1B for storing the master copy of script.

II.2. Network Originated Script Provisioning for a User

In an all-IP network it is desirable that user interfaces for service provisioning should be more powerful and user-friendly than currently existing ones.

One possible scenario is that the service provisioning and service user management in general is done through a service portal (denoted by numeral 2 in FIG. 1), e.g. a web server offering tools and interfaces to the user enabling him to manage his service profile or profiles.

This portal could be accessed with a wireless terminal, which can be, for example a user equipment conforming to so called third generation communications standards, for instance UMTS standards created by 3GPP, via an access path constituted by a radio access network, for instance a GPRS access network, a GSM EDGE access network, a CDMA/WCDMA access network, an IP access network or any other radio access network without consulting the control plane (CSCF) at all (this means that the access to the service portal is a pure data connection, with no speech required). Another possibility (not shown in FIG. 1) is to access the portal with a work station via internet web browsing.

Of course, authorization of users via, for example, a username and password is needed in order to assure consistent updating of user profiles for an all-IP network user. However, these mechanisms are not explained here, as they are not crucial for the present invention. Rather it is assumed that "required authorization issues are taken care of". The service portal and access from an IP Terminal (IPTE) 5a is shown in FIG. 1.

The service portal 2 has an interface towards the script database 1B of the application server (APSE) 1 in order to find out what kind of scripts or script templates may be selected by the user. Furthermore, the service portal 2 has an interface towards the subscriber database HSS (Home Subscriber Server) also denoted by numeral 6, which contains the all-IP user profile information (including list of provisioned scripts and perhaps user's privileges for script usage) in a subscriber profile database 6A.

Now, when the user wants to provision new scripts or modify existing scripts, the portal 2 requests the HSS 6 (i.e. the subscriber profile database 6A) for all-IP user profiles and also requests the script database 1B of the application server 1 for available scripts. Next, the service portal 2 provides the user terminal 5a the user interface according to current profile and script information. A subsequent user interaction between the IPTE and portal then proceeds until the desired functionality is given from the terminal 5a to the portal 2. If the user profile is changed (new scripts provisioned and/or old scripts changed), the portal 2 sends a user profile update request with required script information to the HSS 6, more precisely, to the subscriber profile database 6A thereof. The HSS 6 (subscriber profile database 6A) then updates the all-IP user profile.

II.3. Network Originated Script Distribution Over the All-IP Network Elements

The master copy of the script (script logic) is kept in the script database 1B in the application server 1 (APSE). The script management (SM) functional element 1A attached to the script database 1B provides for script creation, modification and also script distribution. The script management functional element 1A possesses information of the all-IP network elements to which read-only copies of the script logic must be distributed. The distribution may be effected for all scripts to all elements, or the scripts may be grouped for distribution purposes. Note that only the script logic (executable instructions without the data as such to be processed) needs to be stored in the script database 1B. Script data (the data actually to be processed by the scripts) may for example be user specific, and it could be provided by the user profile in HSS. However, in some cases it may be useful to include also the data for the script inside the script logic. Thus, the separation of the logic and data is optional.

The user profile stored in home subscriber server 6 (HSS) contains information of all scripts provisioned for a given user. This information is stored with an identification of a script (script key as a pointer to the script logic of said script stored in said script database 1B), whereas the script (script logic) itself is stored in the script database 1B.

A user profile may also contain (but may also exclude) script specific data, which may either have a default value or a value received from the service portal (possibly given by the user via the terminal 5a during an interaction with the service portal 2). This data (as the data to be processed) is needed when the script is executed. The home subscriber server 6 (HSS) delivers the user profile (including the script key and the data needed by the script) to a serving profile database 7B (SPD) attached to the call state control functional element 7 (CSCF) to which the user is currently registered. Note that the script data may have an absolute data value or possibly a reference to a logical system "variable" (e.g. expression "voice_mail"), which may be translated during script execution. When the serving profile database 7B (SPD) receives the user profile, it may check whether or not the scripts found from the user profile (identified by the script key) can be found from the local database 7A (a secondary storage means for service scripts, i.e. for script logic) of the call state control functional element 7 (CSCF).

If the script identified by the script key in the user profile is not found in the secondary storage for script logic 7A, the serving profile database 7B (SPD) may request the secondary storage 7A to start a script request towards the script database 1B in the application server 1 (APSE). If no script is found from the script database 1B either, the serving profile database 7B (SPD) may either discard the respective script or may start error handling with the home subscriber server 6 (HSS).

II.4. Network Originated Script Execution

The user profile includes information of scripts provisioned for the user. When the user makes a call attempt (originating call or communication) or when a call is placed towards the user (terminating call), the user profile is fetched either from the serving profile database 7B (SPD) (in case of originating calls) or from the subscriber profile database 6A of the home subscriber server 6 (HSS) (in case of terminating calls) to the call state control functional element 7.

The scripts found from the user profile (i.e. those scripts to which script keys in the user profile are pointing) are armed according to script specific conditions. The script specific conditions are provided either by user profile data or by the script logic contents (the script logic stored in the secondary database 7A may include some script execution conditions, if required). The armed scripts also specify (via script specific conditions) the event whose occurrence causes the execution of the script. The call handling of the call state control functional element 7 (CSCF) must monitor those script events and start the script if and when required. The execution event of a script corresponds with the detection point of an armed trigger in an intelligent network.

When the execution event of a script is met, the script logic is fetched (if not fetched during script arming) from the secondary storage 7A using the script key. The script logic and the script specific data (data is received from user profile or possibly from script logic contents) is given to a functional entity handling service requests in the call state control functional entity 7. This entity either directly starts the local script execution or forwards the request towards a functional entity which contains a script execution machinery. The call handling instructions are provided from the execution machinery to the call handling entities internally.

II.5. User Originated Script Creation

The basic characteristics of the scripts are the same for scripts originated from the network or from the user. The following description therefore covers mainly the differences therebetween.

The user may create scripts either within the terminal 5a, 5b or using some external functionality (application run on a workstation, for example) dedicated for the purpose. Since the user himself has control over the script creation, somehow it must be secured that created scripts do not misbehave in the network, where they are executed.

There are several approaches to guarantee this kind of security:

Use of a suitable script language, which allows only a restricted set of available instructions for controlling the call handling. CPL is one example of such a language.

Restricting the allowed instructions during script execution in network, i.e. discard or ignore misbehaving parts of the terminal originated scripts.

Checking and validating the scripts when they are uploaded to the network.

Configuring the user interface available in the terminal for script creation in a way so that illegal instructions cannot be put into the scripts (this does not work for the external functionality for script creation as it is not necessarily part of the network domain).

II.6. User Originated Script Storage, Script Created in the Terminal 5a, 5b

When the user creates the scripts in the terminal (5a, 5b), the scripts can be stored either in the terminal (5a, 5b) itself or the network to which the terminal is registered.

If the master copy of the script is saved in the terminal (5a, 5b), the script may be uploaded to the network for being executed at any time. Furthermore, if the script is executed in the network immediately after uploading, it need not be saved at the network at all.

However, if the script conditions prevent immediate execution of the script, the script must be, at least temporarily, saved in the network (although the master copy is in the terminal (5a, 5b)).

The master copy of a script created within the terminal may also be stored in the network. This is handy especially for scripts that are to be used permanently or for more than one call. In general, scripts that are to be used for at least one call can be stored in the network. The master copy of the script can be stored in the network either in the application server 1 (APSE) or the home subscriber server 6 (HSS).

In case the master copy of the script is stored in the Application Server, it is loaded there either directly or via the Service Portal (the Service Portal may offer a user interface for script uploading). When a script is loaded from the terminal, the application server needs to check and validate the script before adding it to the script database 1B. Some identification can be put to the stored script in order to know that the script originates from the user/terminal. Note that it is preferable to store the script to the Application Server, because this allows the network to handle the script (after checking and validation), at least regarding to script execution, distribution, provisioning and activation, in the same way as the scripts created by the network operator himself.

II.7 User Originated Script Storage, Script Created with External Functionality If the user creates a script (which is to be executed in the network) using some external dedicated functionality (application and/or software), the user may be provided with a flexible and understandable high level user interface for service creation and testing. The external functionality creates the script according to a description given by the user through the functionality's user interface. Thus the burden to be able to create e.g. CPL is left for the external functionality.

The created script is either downloaded from the external software to the terminal (5a, 5b) or the external functionality (software) may have a connection to the Application Server 1 for service script uploading either through the Service Portal 2 or directly to the Application Server. In case the script is downloaded to the terminal, it is further handled as if it was created in the terminal. In case uploading is done to the Application Server (possibly via the Service Portal) the Application Server/Service Portal needs to take care of the authentication and authorization of the user trying to upload scripts and check/validate the script to be uploaded to prevent from malicious or incorrect script storage.

II.8 User Originated Script Provisioning

The script provisioning is exactly the same as with network originated scripts if the master copy of the script is stored in the application server 1. If the master copy is stored in the terminal, provisioning is not needed, since the script is uploaded to the network for execution by the terminal.

II.9 User Originated Script Execution

Script execution is basically the same as with network originated scripts: the provisioned scripts are executed when the script specific conditions are fulfilled and when the event which triggers the execution of the script is encountered. Note that the execution conditions may also be provided call specifically: for example it is possible that a script execution condition relates to a setup message data: the script is executed only when a certain field is recognized in e.g. SIP Invite message body part.

As described above, call processing language scripts can be inserted in the call processing servers from various sources. However, a problem with the method according to the current CPL specifications is that the CPL scripts are treated as monolithic XML-documents. This means that the whole document comprising the script must be transmitted between network elements in completeness. According to RFC 2824, this takes place at network registration. This means that the script is uploaded, for instance, as an embedded content within the SIP registration message. This script may have been composed using authoring tools within the user equipment such as an IP telephony terminal.

Similarly, it is under the responsibility of the user or network administration to upload the needed CPL scripts to the different network elements. It is under the responsibility of the user to know the servers to which the scripts have been uploaded.

Furthermore, general reference has been made to a script key as a pointer to stored script logic. According to a further aspect of the present invention, scripts to be executed are composed based on script logic addressed (pointed to) by a respective script key. In particular, a script key is represented as a bit vector, with one bit of said bit vector representing the type of service and the remaining bits of said bit vector representing features of said type of service. Thus, each script key addresses a script logic fragment as a corresponding script, and a script to be executed is composed from the script fragments addressed by the script keys, and the script logic of the composed script is thereafter executed with the user specific script data.

Stated in other words, the starting point of this aspect of the invention is that the script (for example, a CPL script) is composed at the O-CSCF (originating call state control functional element in case of a network comprising plural call state control functional elements due to its size), and not at the end user terminal, (as hitherto usual in connection with SIP). The idea of this aspect of the invention is to define in the home subscriber server's (HSS) registers (i.e. in its database) bit vectors that represent the provisioned services and features for e.g. outgoing calls. The bits represent the status of a service. For each service represented in the vector, there is a code fragment in the O-CSCF representing the service (for example, in the secondary storage for script logic 7A, as shown in FIG. 1). The CPL script to the outgoing invite method is then composed from the code fragments in accordance with the bits on in the bit vector. Alternatively, if the interaction of the services is not sequential, a set of bits is mapped to the code fragment. A whole CPL script may consist of both fragments that can be appended sequentially and fragments which have been selected depending on a combination of service bits. Further, the CPL script may contain a slot for user provided fragments.

Thus, SIP CPL scripts are encapsulated into SIP invite methods in a large IP telephony network. Thereby, some signaling is saved, and the CPL script composition process is controlled by the operator.

Figure 2:
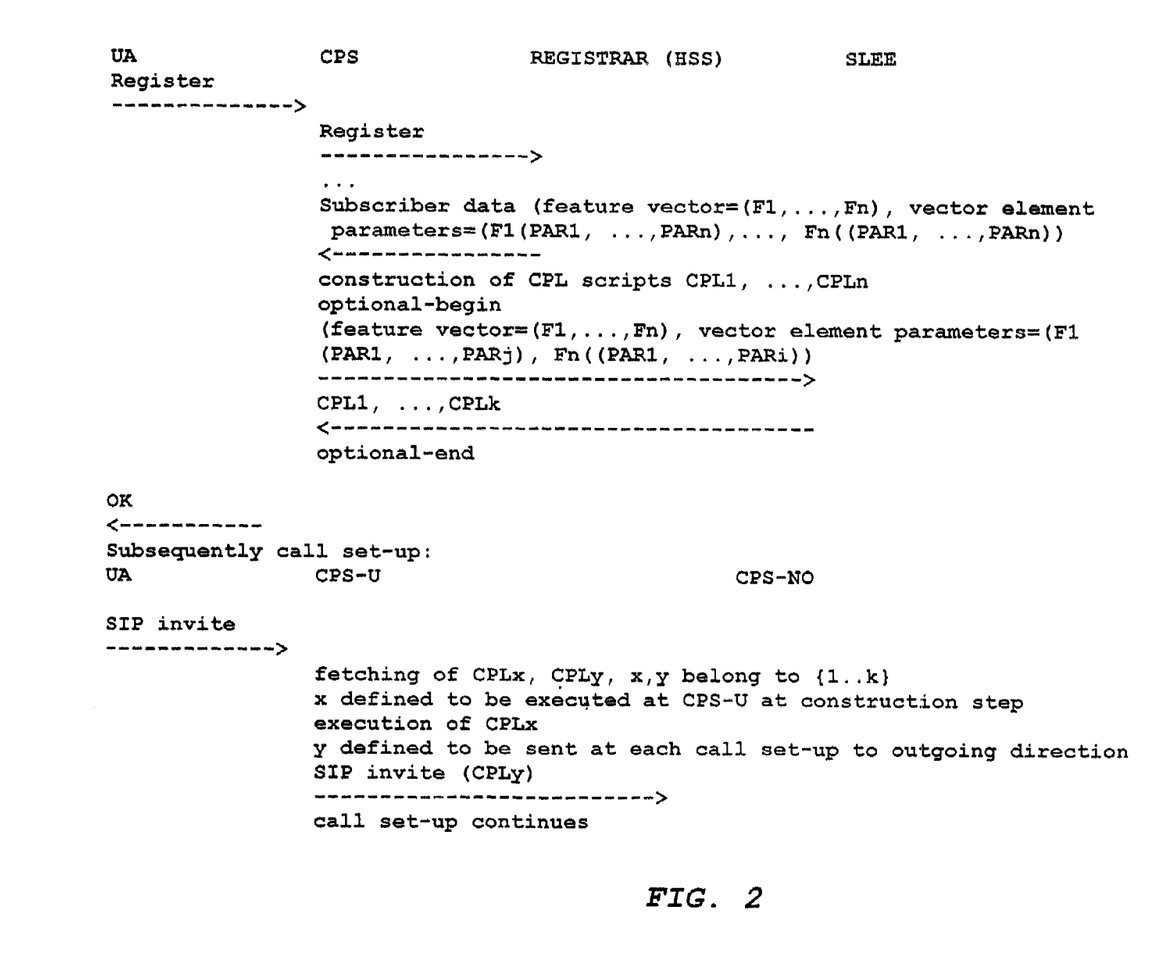
FIG. 2 illustrates a basic signaling scenario in connection with the composition of a script.

To set out the above further aspect of the present invention in more detail, reference is made to FIG. 2.

FIG. 2 illustrates a basic signaling scenario in connection with the composition of a script. Namely, the network operator provides within call processing servers a functionality to automatically compose CPL scripts from feature bit vectors.

Advantageously, this greatly reduces the burden on the end-user and the network operator, because CPL scripts causing unexpected behavior due to being written or configured by inexperienced end users do not have to be debugged separately. Similarly, it can be envisioned, that as the CPL script language is extended over the time, that the size of the CPL scripts to be uploaded to the network elements grows. This has significance in the case of wireless terminals, so that with the present aspect of the invention being implemented, the network bandwidth is not consumed by transmitting big XML-documents over the air at network registration.

The idea of the present invention is to define for the call processing server only a feature set and its parameters which identifies the structure and the content of the needed call processing language script.

This means that, for instance, from the home subscriber server HSS at network registration or location updating, there is loaded to the CPS (call processing server) as a network element which comprises the call state control functionality CSCF, a feature vector describing the aims of the CPL script. The feature vector bits could define, for instance, call barring features, call rerouting features and user notification features (e.g. E-mail on each missed or forwarded calls). The interpretation of the feature vectors is based on HSS and CPS mutual agreement. Thus when for example subscriber data is loaded from the HSS or an equivalent service register to the CPS, the CPS inspects the feature vector associated with user data. Similarly, it inspects the parameters included also in the message in addition to the feature vectors. A parameter or a set of parameters is associated a given feature vector. The parameters can be opaque with respect to the CPS.

According to the feature vector, the CPS selects the most appropriate CPL skeleton and inserts the parameters to the places in the skeleton as specified by the vector specific logic.

It should be noted that the HSS or registry from which the feature vectors are extracted can be any subscriber data register storing information, such as location or service data relating to subscribers. Examples of such subscriber data registers are e.g. the HSS of UMTS, general SIP location registers, DHCP (Dynamic Host Configuration Protocol) servers and LDAP/X.500 directory servers. The general SIP location registers store information on user whereabouts and they can be inquired for routing information. The DHCP servers and LDAP/X.500 servers can be used e.g. in small corporate networks to download subscriber information to the SIP servers currently serving a subscriber.

In a modification of this aspect of the invention, the feature vector is interpreted so that each element represents the presence or absence of a feature. Thus each bit position in the bit vector has fixed meaning.

In another modification of the invention, the feature vector elements represent feature identifiers, which point to a certain feature and possibly to certain CPL script code skeletons.

In an embodiment of the invention the inspection of the feature vectors and the composing of the CPL script is performed in a service execution environment (SLEE) within the CPS or associated with it via a signaling interface such as an IN interface (e.g. based on CAMEL specifications). The service execution environment could be e.g. a Java based virtual machine. The service execution environment is triggered at registration to the network, benefically from the CPS receiving the subscriber data and feature vector. The service execution environment obtains the subscriber data from the CPS. It constructs the CPL script to be stored to the CPS or to be sent at call set-up in the direction of the CPS of the called party.

The SLEE (service execution environment) can compose a multitude of CPL scripts when receiving the feature vectors and their parameters. There can be separate sub-feature vectors for CPL scripts to be sent to call processing servers of an outgoing call (called party direction) and separate scripts to be stored within the users current serving CPS (CPS corresponds to CSCF according to UMTS release 00 architecture).

In a modification of the invention, several SIP servers (CPS: call processing servers including a CSCF functionality) may participate in the call set-up process in the originating network or domain. This means that in the originating network the call set-up may pass several servers before it is finally routed to a different network. The CPL scripts formed on the basis of information received from the registry (e.g. HSS), may be dedicated to different servers via which the call is set-up. Therefore, after the construction of the CPL scripts, some of the scripts may be distributed to different servers via which the call is known or anticipated to be set-up. This is possible e.g. so that to each of the constructed scripts there is associated and/or allocated the role or address of the server to which it must be installed. The CPS communicating with the registry knows the meaning of the roles and the servers acting in these roles for the subscriber. The CPS then knows to which servers it must send each script which is not dedicated for it.

For instance, in the UMTS system (release 00 all-IP network) the call set-up first goes via a proxy server in the currently visited network, from where it is routed to an incoming call gateway server in the home network. The incoming call gateway server hides the structure of the home network from the visited network, so the contact point is always the same for the proxy in the visited network, unless load sharing is performed between different servers. This means that the proxy server always sends the set-up to the same incoming call gateway server or servers(ICG). The ICG then inquires e.g. the HSS with caller identification and determines the server (CPS, serving CSCF) currently serving the caller.

Therefore, when the feature vector is received at the CPS interacting with the HSS, the analysis of the feature vector can result into the creation of several CPS scripts. These scripts may be dedicated to be distributed to different call processing servers. The dedication is either based on information contained in the feature vector or it is based on the decisions made in the CPS (e.g. further in the SLEE affiliated with the CPS).

For instance, some of the scripts may be dedicated to the proxy server in the visited network, some to the currently serving CPS, some to the incoming call gateway and some to be sent to the destinations of outgoing calls. When the script construction has been performed in the CPS communicating with the HSS, the CPS sends the scripts to the servers to which the scripts are dedicated. The CPS may have received the proxy server address and incoming call gateway address in the registration request. In load sharing cases, a copy of the same script may be sent to each of the servers between which the load is shared in the same roles (e.g. as incoming call gateway).

The above presented enables, for instance, that the scripts sent to the proxy server in the visited network cause that certain call set-up requests are denied in the visited network before bothering the home network. The benefit of the solution is that the end-user doesn't know the servers participating in call set-up. In some cases this has been hidden from the end-user. Therefore, it would not be possible for the end user to install the scripts separately to each possible server participating in call set-up as in the case of very simple IP telephony networks. The feature vectors in the HSS or registry are managed by some management application. The end-user contacts the management system of the operator via some graphical user interface. The end-user then makes some feature selections, activations and configurations (e.g. to activate call barring). There may not be a one-to-one relationship between these features and the features in the feature vector. The user selections are interpreted by the management system, which manipulates the feature vectors in the HSS to be sent to the call processing servers later on. At the revocation of certain features, the HSS or registry notifies the current CPS of the new feature vector. This causes the CPS to send a delete request to the other call processing servers to which the scripts that are no longer valid have been sent. When a user is considered unreachable by the network, the CPS making this observation performs implicit detach on the user and notifies all call processing servers which may have scripts for the user. For instance, the CPS making the observation may e.g. multicast or broadcast a delete request for the CPS scripts valid for the user to the network. As a result, no hanging old scripts may remain in the network.

The CPL scripts that are attached to outgoing SIP invite requests (call set-up messages) can be used to update the version of the calling user associated CPL scripts in call processing servers in the direction of an outgoing call (CPS-U in FIG. 2). In that case they replace the version stored therein. Alternatively, these scripts can follow the SIP invite message (or similar call set-up message) all the way to the called party final CPS (CPS-NO in FIG. 2) which contact the called party user agent (UA, functionality implemented within IP terminal equipment TE) directly. These scripts can guide the call set-up all the way in the proxying and redirecting call processing servers and specify for example messages to be sent to various recipients in case of for example failure to set-up the call to any given specified party.

Finally, it has to be noted that
- an application server APSE could also be a service control point SCP, or any element responsible for giving controlling instructions for session management (call handling),
- a home subscriber server HSS as a subscriber information register could also be a home location register HLR of a GSM network, or any other element having a subscriber information register,
- a CSCF could be the call control function of a MSC or MSC Server, call control function of CPS (which actually is the CSCF), call control function of a fixed network switch, or a SIP server responsible for routing the SIP messages between end points,
- portal could also be accessed through WAP or SMS,
- script can refer to any portable service logic PSL, i.e. any form of logic that can be transferred from its creation and management environment to some different element in the network for execution purposes, This element can be CPS, HSS, APSE, IPTE. Even the IN service logic designed to control the switch through traditional protocols such as INAP, CAMEL, WIN, OSA could be designed in such a way that instead of executing the instruction in the SCP, the logic could be moved to the switch and have the INAP, CAMEL, WIN, OSA as an interface in the switch. That is, a service script can be any portable service logic, not only the script logics specified especially to be "scripts" (CPL, CGI, Servlets).

Accordingly, as has been described above, the present invention proposes a communication network, said network comprising at least an application server means, a subscriber information register means, a call state control functional entity, and a service portal, wherein said application server means is connected to said service portal and to said call state control functional entity, said service portal is further connected to said home subscriber server means, and said subscriber information register means is further connected to said call state control functional entity. In connection with the proposed network architecture, the present invention also proposes methods for handling service scripts within the network with regard to creation and storage of service scripts, provisioning the service scripts for a user, distribution of the scripts in the network and execution of the scripts during call processing.

It should be understood that the above description and accompanying drawings are only intended to illustrate the present invention by way of example only. The preferred embodiments of the present invention may thus vary within the scope of the attached claims.

What is claimed is:
1. A communication network comprising:
   an application server including a script database adapted to store master copies of service scripts,
   a subscriber information register including a subscriber profile database that is configured to contain for each script selected by a user, a script key as a pointer to script logic of said script stored in said script database, and script data unique to said user, and wherein said script key is represented as a bit vector, with one bit of said bit vector representing the type of a service and the remaining bits of said bit vector representing features of said type of service,
   a call state control functional entity, and
   a service portal, wherein
   said application server is connected to said service portal and to said call state control functional entity,
   said service portal is further connected to said subscriber information register, and
   said subscriber information register is further connected to said call state control functional entity, wherein said application server comprises
   a script management functional entity, adapted to manage functionality in the script database of said application server, including creating service scripts by a network operator and storing said service scripts in said script database; and
   the service portal adapted:
   to load, upon request of a respective user to manage his profile, a copy of the master copies of the scripts from said script database and a copy of currently set scripts for said respective user from the subscriber profile database to the service portal,
   to provide a user interface according to currently set script settings at said service portal, to select a loaded service script for changing the current setting of the profile, and to store an update of the set script settings in said subscriber profile database.

2. A communication network according to claim 1, wherein said script management functional entity is exclusively accessible by an operator of said communication network.

3. A communication network according to claim 1, wherein said script management functional entity is adapted to manage scripts to be stored or already stored.

4. A communication network according to claim 1, wherein said script database is connected to said service portal and to a secondary storage for service scripts of said call state control functional entity.

5. A communication network according to claim 1, wherein said call state control functional entity further comprises a serving profile database, and wherein said connection between said subscriber information register and said call state control functional entity is established between the respective databases thereof.

6. A communication network according to claim 1, wherein said service portal is connectable via an access path to a terminal equipment.

7. A communication network according to claim 6, wherein said terminal is a wireless user equipment and said access path is established via a mobile communications network.

8. A communication network according to claim 6, wherein said terminal is a workstation and said access path is established via the Internet.

9. A communication network according to claim 1, wherein a communication originates from or terminates at a terminal equipment, said terminal being connected to said call state control functional entity via an access network.

10. A communication network according to claim 6, wherein said terminal equipment is operated based on the internet protocol.

11. A communication system comprising:

a communication network comprising:

an application server including a script database adapted to store master copies of service scripts, a subscriber information register including a subscriber profile database that is configured to contain for each script selected by a user, a script key as a pointer to script logic of said script stored in said script database, and script data unique to said user, and wherein said script key is represented as a bit vector, with one bit of said bit vector representing the type of a service and the remaining bits of said bit vector representing features of said type of service, a call state control functional entity, and a service portal, wherein said application server is connected to said service portal and to said call state control functional entity, said service portal is further connected to said subscriber information register, and said subscriber information register is further connected to said call state control functional entity, wherein said application server comprises a script management functional entity, adapted to manage functionality in the script database of said application server, including creating service scripts by a network operator and storing said service scripts in said script database;

the service portal adapted:

to load, upon request of a respective user to manage his profile, a copy of the master copies of the scripts from said script database and a copy of currently set scripts for said respective user from the subscriber profile database to the service portal, to provide a user interface according to currently set script settings at said service portal, to select a loaded service script for changing the current setting of the profile, and to store an update of the set script settings in said subscriber profile database;

and wherein the communication system further comprises:

a terminal equipment, connectable via an access path established via a mobile communications network to the service portal, said terminal equipment comprising a functional entity which is adapted to enable the user of said terminal to manage service scripts, said managing comprising at least one of the following functions: create, test, distribute and modify service scripts.

12. A method of handling service scripts within a communication network, comprising:

creating service scripts by a network operator using a script management functional entity, storing said service scripts in a script database adapted to store master copies of service scripts, loading, upon request of a respective user to manage his profile, a copy of the master copies of the scripts from said script database and a copy of currently set scripts for said respective user from a subscriber profile database, to a service portal, providing a user interface according to currently set script settings at said service portal, selecting a loaded service script for changing the current setting of the profile, and storing an update of the set script settings in said subscriber profile database, wherein said subscriber profile database contains, for each script selected by a user, a script key as a pointer to the script logic of said script stored in said script database and script data unique to the respective user, and wherein said script key is represented as a bit vector, with one bit of said bit vector representing the type of a service and the remaining bits of said bit vector represent features of said type of service.

13. A method of handling service scripts according to claim 12, further comprising:

providing a user interface in the service portal to receive user originated scripts for storage in the application server.

14. A method of handling service scripts according to claim 12, wherein currently set scripts for said respective user in said subscriber profile data base are network originated scripts created in the network by the network operator or user originated scripts created by the user of a terminal at the terminal, or created by a user using an external functionality dedicated for service script creation.

15. A method of handling service scripts according to claim 12, further comprising:

forwarding said script keys and script data contained in said subscriber profile database to a serving profile database of a call state control functional entity, checking that for the received script key a corresponding script is contained in a secondary storage for service scripts of said call state control functional entity, and fetching the corresponding script logic from the secondary storage upon occurrence of a script execution event.

16. A method of handling service scripts according to claim 15, wherein each script key addresses a script logic fragment as a corresponding script, and which method further comprises:
   composing a script to be executed from the script fragments addressed by the script keys, and
   executing the script logic of the composed script with the user specific script data.

17. A communication network according to claim 7, wherein the mobile communications network is a general packet radio service.

18. A communication network according to claim 1, further configured:
   for forwarding said script keys and script data contained in said subscriber profile database to a serving profile database of the call state functionality entity; and
   the call state functional entity configured:
      for checking that for the received script key a corresponding script is contained in a secondary storage for service scripts of said call state control functionality entity, and
      upon request from the service portal, for fetching the corresponding script logic from the secondary storage upon occurrence of a script execution event.

19. A communication network according to claim 18, wherein each script key addresses a script logic fragment as a corresponding script, and wherein the communication network is further configured:
   for composing a script to be executed from the script fragments addressed by the script keys, and
   for executing the script logic of the composed script with the user specific script data.

20. A communication system according to claim 11, further configured:
   for forwarding said script keys and script data contained in said subscriber profile database to a serving profile database of the call state functionality entity; and
   the call state functional entity configured:
      for checking that for the received script key a corresponding script is contained in a secondary storage for service scripts of said call state control functionality entity, and
      upon request from the service portal, for fetching the corresponding script logic from the secondary storage upon occurrence of a script execution event.

21. A communication system according to claim 20, wherein each script key addresses a script logic fragment as a corresponding script, and wherein the communication system is further configured:
   for composing a script to be executed from the script fragments addressed by the script keys, and
   for executing the script logic of the composed script with the user specific script data.

22. An apparatus for handling service scripts within a communication network, comprising:
   means for creating service scripts by a network operator using a script management functional entity,
   means for storing said service scripts in a script database adapted to store master copies of service scripts,
   means for loading, upon request of a respective user to manage his profile, a copy of the master copies of the scripts from said script database and a copy of currently set scripts for said respective user from a subscriber profile database, to a service portal,
   means for providing a user interface according to currently set script settings at said service portal,
   means for selecting a loaded service script for changing the current setting of the profile, and
   means for storing an update of the set script settings in said subscriber profile database, wherein said subscriber profile database contains, for each script selected by a user, a script key as a pointer to the script logic of said script stored in said script database and script data unique to the respective user, and
   wherein said script key is represented as a bit vector, with one bit of said bit vector representing the type of a service and the remaining bits of said bit vector represent features of said type of service.

* * * * *